United States Patent [19]
George

[11] Patent Number: 5,345,151
[45] Date of Patent: Sep. 6, 1994

[54] AUTOMATIC CALIBRATION IN A WAVEFORM GENERATOR FOR DEFLECTION

[75] Inventor: John B. George, Carmel, Ind.

[73] Assignee: Thomson Consumer Electronics, Inc., Indianapolis, Ind.

[21] Appl. No.: 115,602

[22] Filed: Sep. 3, 1993

[51] Int. Cl.[5] .................................. H01J 29/51
[52] U.S. Cl. ............................. 315/368.23; 315/371
[58] Field of Search ............... 315/368.11, 368.18, 315/368.21, 368.23, 371

[56] References Cited

U.S. PATENT DOCUMENTS

| | | | |
|---|---|---|---|
| 3,930,185 | 12/1975 | Barkow et al. | 315/370 |
| 3,942,067 | 3/1976 | Cawood | 315/13 |
| 4,318,032 | 3/1982 | Kureha | 315/368 |
| 4,500,816 | 2/1985 | Murphy | 315/368 |
| 4,524,307 | 6/1985 | Wahlquist | 315/368 |
| 4,935,674 | 6/1990 | Rodriguez-Cavazos | 315/368 |
| 4,961,030 | 10/1990 | Ogino et al. | 315/368.23 |
| 4,972,127 | 11/1990 | Rodriguez-Cavazos | 315/371 |
| 4,977,355 | 12/1990 | Rodriguez-Cavazos et al. | 315/368 |
| 5,161,002 | 11/1992 | Rodriguez-Cavazos et al. | 358/140 |

Primary Examiner—Theodore M. Blum
Attorney, Agent, or Firm—Joseph S. Tripoli; Joseph J. Laks; Sammy S. Henig

[57] ABSTRACT

An analog multiplier is used for generating an output signal that is coupled to a convergence winding of a projection television. The analog multiplier multiplies a horizontal rate sawtooth signal with a vertical rate parabola signal. To prevent temperature related drift, tolerances and component aging from affecting the output signal, the multiplier is calibrated during each vertical blanking interval.

8 Claims, 1 Drawing Sheet

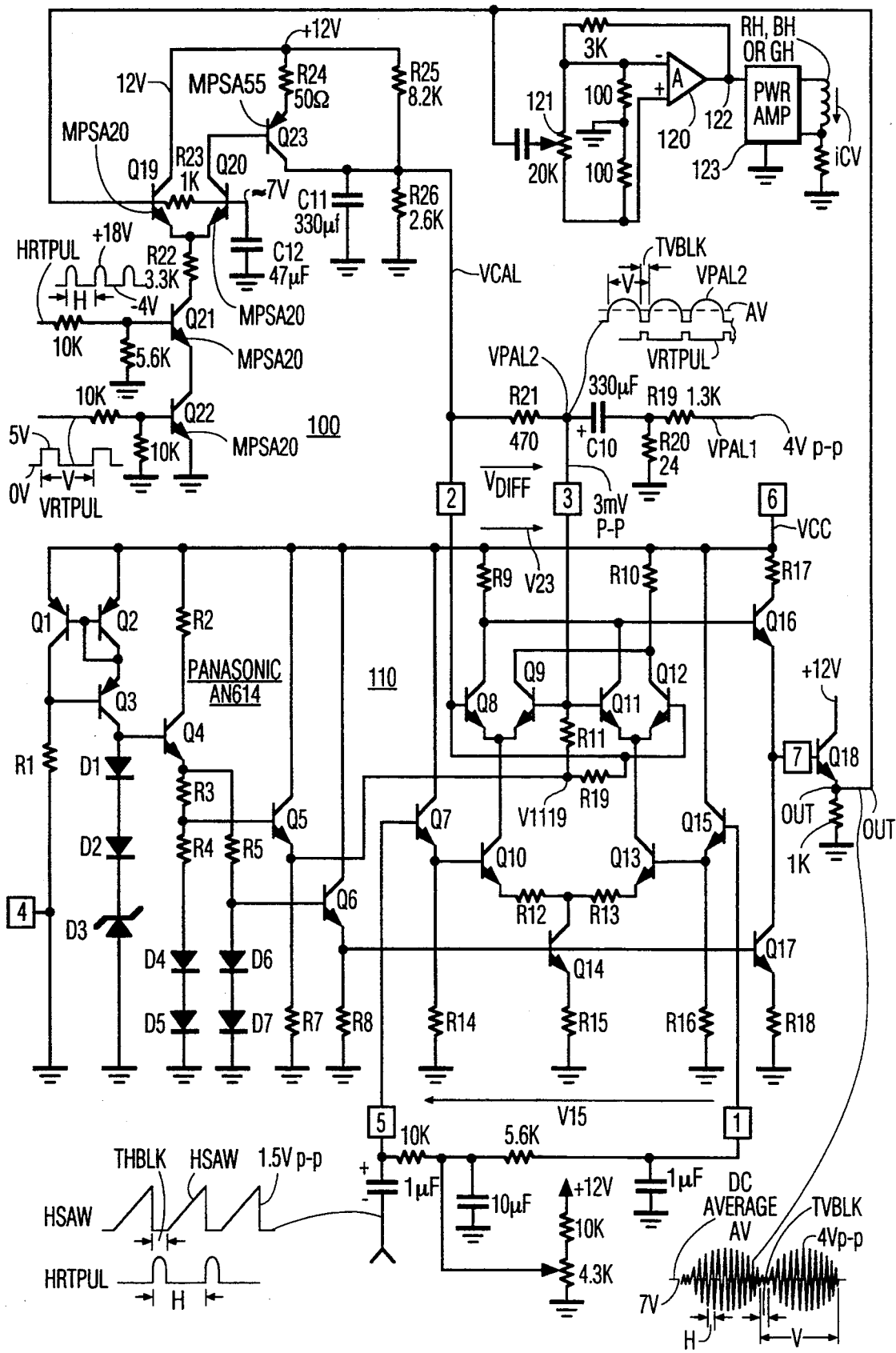

AUTOMATIC CALIBRATION IN A WAVEFORM GENERATOR FOR DEFLECTION

The invention relates to a waveform generator for a deflection apparatus of a video display.

To correct for E-W pincushion distortion with respect to an electron beam that produces a green raster in a cathode ray tube (CRT) of, for example, a projection television receiver, and to correct for the misconvergence with respect to the electron beams that produce the blue and red rasters, a convergence winding is employed. The convergence winding is driven by a sawtooth current component at a horizontal rate with an amplitude that varies in a vertical rate parabolic manner. The waveform of the sawtooth current component is produced in a four-quadrant analog multiplier. The multiplier receives a vertical rate parabola signal at a first input and a horizontal rate sawtooth signal at a second input.

During vertical blanking, the vertical rate parabola signal is at a level that is intended to produce by the multiplication operation, minimum peak-to-peak amplitude of the sawtooth output signal of the multiplier.

Disadvantageously, because of, for example, tolerances, drifts and components aging, the multiplier could operate in an imbalanced condition that is equivalent to having a DC voltage shift or offset at the first input. Consequently, the peak-to-peak amplitude of the output signal may not be minimal, during vertical blanking. Such imbalanced operation may be undesirable.

In one prior art arrangement, a service adjustable DC input offset voltage has been introduced at an input of the multiplier in a manner to compensate for the imbalanced condition. Disadvantageously, temperature variation and components aging may re-introduce such imbalanced condition in the multiplier that cannot be corrected without a service adjustment.

It may be desirable to calibrate the multiplier periodically, for example, during each vertical blanking interval, such that the above-mentioned imbalance is automatically eliminated.

A video display deflection apparatus, embodying an aspect of the invention, includes a source of a modulation signal at a frequency that is related to a vertical deflection frequency and a source of a second signal at a frequency that is related to a horizontal deflection frequency. A modulator responsive to the modulation and second signals generates an output signal at a frequency that is related to the horizontal deflection frequency, modulated in accordance with the modulation signal. An amplifier is responsive to the output signal and coupled to a winding for generating a magnetic field that corrects for a beam landing error in a cathode ray tube. A calibration signal that is coupled to an input of the modulator is generated for reducing an amplitude of the output signal in a negative feedback manner during a predetermined portion of a period of the modulation signal remote from a peak amplitude of the output signal.

The sole FIGURE illustrates partially in a block diagram manner a convergence/E-W correction circuit, embodying an aspect of the invention, of a projection television receiver.

The FIGURE illustrates a convergence/E-W correction circuit 100, embodying an aspect of the invention, in a projection television receiver. A horizontal rate sawtooth signal HSAW, produced in a conventional manner, not shown, is AC coupled to an input of an analog multiplier 110, between pins 1 and 5, to form a sawtooth signal V15 that includes both AC and DC components.

A vertical rate parabola signal VPAL1 that is produced in a conventional manner, not shown, is coupled via a voltage divider, formed by a resistor R19 and a resistor R20, and then AC coupled via an electrolitic capacitor 40 to pin 3 of multiplier 110 to form an AC parabola signal component VPAL2. Signal component VPAL2 is developed both at a base of a transistor Q9 and at a base of a transistor Q11 of multiplier 110. A large capacitor C11 that is coupled to pin 3 of multiplier 110 maintains pin 2 at a constant or at A/C ground potential with respect to parabola signal component VPAL2. Thus, AC signal component VPAL2 is developed across a resistor R21 of a combined AC/DC signal V23, between pins 3 and 2 of multiplier 110.

A DC signal component $V_{DIFF}$ is developed across resistor R21, between pins 2 and 3 of multiplier 110. DC signal component $V_{DIFF}$ is determined by a constant voltage V1119, between a resistor R11 and a resistor R14, by a ratio between resistors R21 and R11 and by a level of an adjustment or a calibration signal VCAL. Combined AC/DC signal V23 across resistor R21 is equal to the sum of AC signal component VPAL2 and DC signal component $V_{DIFF}$.

Multiplier 110 produces a sawtooth output signal OUT that varies in accordance with the result of the multiplication of the instantaneous values of signals V23 and V15. Signal OUT having a DC voltage component is AC-coupled in a conventional manner to a pre-amplifier 120 via a potentiometer 121. Other waveforms that are also coupled to pre-amplifier 120, in a conventional manner, for effectuating convergence are not shown for simplifying the diagram. Potentiometer 121 is adjusted for controlling the amplitude as well as the phase, 0° or 180°, of an output signal 122 of amplifier 120 with respect to signal OUT. Signal 122 is coupled via a power amplifier 123 to a corresponding convergence coil, for example, convergence coil RH, RB or RG, for producing a corresponding convergence current iCV in the coil. Current iCV provides E/W pincushion correction. When applied to the green beam it corrects geometry; alternatively, when applied to the blue beam or red beam, it provides convergence.

A variation of signal VCAL produces a corresponding variation of DC component signal $V_{DIFF}$ that determines during which portion of parabola signal VPAL2, a peak-to-peak amplitude of signal OUT is at a minimum. When calibrated, multiplier 110 produces the peak-to-peak amplitude of signal OUT at the minimum and at a predetermined phase in accordance with signal VPAL2, during a vertical blanking interval TVBLK.

In accordance with an aspect of the invention, signal VCAL is produced automatically in a feedback control loop mode of operation. To produce signal VCAL, signal OUT is coupled to a base of a transistor Q19 that forms a differential amplifier with a transistor Q20. A base voltage of transistor Q20 is developed by passing signal OUT via a low pass filter formed by a resistor R23 and a capacitor C12. As a result, a base voltage of transistor Q20 does not contain AC component signal and has a DC magnitude that is equal to the average value of the base voltage of transistor Q19.

A pair of transistor switches Q21 and Q22 are coupled in series for producing an emitter current via a resistor R22 in one or both transistors Q19 and Q20 when both transistor switches Q21 and Q22 conduct. Transistor switch Q22 is turned on by a vertical blanking signal VRTPUL, only during vertical blanking interval TVBLK. Transistor switch Q21 is turned on by a horizontal retrace pulse HRTPUL, only during an interval THBLK, at corresponding peak portion of signal HSAW. Such peak portion of signal HSAW occurs between a retrace ramp portion HSAW1 and a trace ramp portion HSAW2. Transistor switch Q1 is turned on, during the peak of signal HSAW that is approximately flat or constant.

A collector of transistor Q20 is coupled to a base of a transistor Q23 for turning on transistor Q23 when transistor Q20 is conductive; otherwise, transistor Q23 is nonconductive. An emitter resistor R24 is coupled to an emitter of transistor Q23. The emitter/collector current of transistor Q23 is determined by resistor R24 when transistor Q23 is turned on by transistor Q20. The collector of transistor Q23 is coupled to capacitor C11 to charge capacitor C11, when transistors Q20 and Q23 are conductive. A voltage divider formed by a resistor R25 and a resistor R26 develops a predetermined DC voltage in capacitor C11. For steady state operation, transistor Q23 produces a collector current that increases the voltage level of signal VCAL above what is produced by resistors R25 and R26. When both transistor switches Q21 and Q22 are turned on, the collector current in transistor Q20 is determined by a difference between a level of a fiat portion, not shown, of sawtooth signal OUT, that is produced during interval THBLK, and the average value of signal OUT that is developed at the base voltage of transistor Q19, as explained before. The voltage difference between the base voltages of transistors Q19 and Q20 is proportional to the peak-to-peak amplitude of signal OUT, during vertical blanking interval TVBLK. The voltage difference between the base voltages of transistors Q19 and Q20 is sampled for controlling the conduction of transistor Q23.

Should the peak-to-peak amplitude of signal OUT tend to increase, during interval TVBLK, transistor Q23 would turn on harder and for a longer period of time in a manner to increase DC signal VCAL. In this way, the peak-to-peak amplitude of signal OUT is automatically reduced, during interval TVBLK. On the other hand, should signal VOUT be in the opposite polarity than required, during horizontal blanking interval THBLK, transistor Q23 will not turn on and signal VCAL will decrease until signal VCAL becomes sufficiently small to cause polarity reversal. Thus, in steady state operation, during interval TVBLK, the phase of signal OUT is a predetermined phase and its amplitude is at a minimum as controlled by the feedback loop gain.

What is claimed is:

1. A video display deflection apparatus, comprising:
    a source of a modulation signal at a frequency that is related to a vertical deflection frequency;
    a source of a second signal at a frequency that is related to a horizontal deflection frequency;
    a modulator responsive to said modulation and second signals for generating an output signal at a frequency that is related to said horizontal deflection frequency, modulated in accordance with said modulation signal;
    an amplifier responsive to said output signal and coupled to a winding for generating a magnetic field that corrects for a beam landing error in a cathode ray tube; and
    means responsive to said output signal for sampling said output signal, during a predetermined portion of a period of said modulation signal, remote from a peak amplitude of said output signal to generate an adjustment signal that is coupled to an input of said modulator to reduce an amplitude of said output signal in a negative feedback manner.

2. An apparatus according to claim 1, wherein said adjustment means maintains said amplitude of said output signal at a minimum during a vertical blanking interval.

3. An apparatus according to claim 2, wherein said output signal varies in a sawtooth manner and wherein said calibration signal is generated, during an interval that occurs between a retrace ramp portion and a trace ramp portion of said output signal.

4. An apparatus according to claim 1, wherein said adjustment means is responsive to a third signal that is indicative of an occurrence of a vertical blanking interval and to a fourth signal that is indicative of an occurrence of a horizontal blanking interval for generating said adjustment signal in accordance with said amplitude of said output signal that occurs when both said third and fourth signals occur simultaneously.

5. An apparatus according to claim 1, wherein said modulator comprises an analog multiplier that multiplies said modulation and second signals and wherein said adjustment signal is a substantially constant DC signal during said period of said modulation signal.

6. An apparatus according to claim 1, wherein said adjustment means comprises, a low-pass filter responsive to said output signal for filtering out AC components from said output signal to produce a signal that is indicative of a DC average level of said output signal and a comparator responsive to said low-pass filtered and unfiltered output signals for generating said adjustment signal in accordance with a difference between said low-pass filtered and unfiltered output signals.

7. An apparatus according to claim 1, wherein said modulation signal has a parabolic waveform, said second signal has a sawtooth waveform and said output signal has a sawtooth waveform with an amplitude that is modulated in accordance with said modulation signal.

8. An apparatus according to claim 1, wherein said winding comprises a convergence winding of said cathode ray tube.

* * * * *